United States Patent [19]

Scarpetti

[11] Patent Number: 5,720,618

[45] Date of Patent: Feb. 24, 1998

[54] VACUUM TEACHING DEVICE

[76] Inventor: Darlene Scarpetti, 528 W. 111 St., Apt. 65, New York, N.Y. 10025

[21] Appl. No.: 642,893

[22] Filed: May 6, 1996

[51] Int. Cl.[6] ................................................. G09B 23/06
[52] U.S. Cl. .............................................. 434/300; 434/283
[58] Field of Search ....................................... 434/283, 300, 434/302

[56] References Cited

U.S. PATENT DOCUMENTS 3,343,701  9/1967  Mahoney ................................. 215/52

FOREIGN PATENT DOCUMENTS 0186783  7/1986  European Pat. Off. .
2061891  5/1981  United Kingdom .

OTHER PUBLICATIONS

Balloon In A Vacuum, Internet:http://www.physics.unc.edu/~labs/demo/thermo/4e20.40html, UNC Physics & Astronomy.

*Primary Examiner*—Robert A. Hafer
*Assistant Examiner*—Laura Fossum

[57] ABSTRACT

The present invention relates to a vacuum teaching device (10) comprising: a housing (12) which comprises a housing top (12A) having a housing top opening (12AA) therein, a housing bottom (12B) and a housing middle (12C) having a housing middle neck piece (12CA) pneumatically sealed thereon. The housing middle neck piece (12CA) has a housing middle neck piece opening (12CAA) therein. A housing top cap (12D) is removably and pneumatically fastenable to the housing top (12A). A balloon (14) is positioned within a housing inside (12E) of the housing (12). The balloon (14) comprises a balloon opening (14A) which is stretched overlapping the housing middle neck piece (12CA) and housing middle neck piece opening (12CAA) forming a pneumatic seal therebetween. When air pressure is reduced within the housing inside (12E) by vacuuming air through the housing top opening (12AA), the balloon (14) automatically inflates.

2 Claims, 2 Drawing Sheets

5,720,618

VACUUM TEACHING DEVICE

BACKGROUND OF THE INVENTION

1. Field of the Invention

The present invention relates to vacuum teaching device. More particularly, the present invention relates to vacuum teaching device consisting of a balloon within a housing to illustrate the physical properties of air pressure, specifically decreasing air pressures within a contained environment, and its interactions with the elastic properties of the balloon.

2. Description of the Prior Art

Vacuum devices are well known in the art. They range from a simple household vacuum cleaner to a more elaborate decompression/compression chamber. However, all well known devices are too complex to utilize to teach science students the physics of air pressure differentials.

Numerous innovations for vacuum devices have been provided in the prior art that are described as follows. Even though these innovations may be suitable for the specific individual purposes to which they address, they differ from the present invention as hereinafter contrasted.

In U.S. Pat. No. 5,465,864, titled VENTING THERMOPLASTIC CONTAINER FOR A PACKAGE WITH A BLADDER SYSTEM, invented by Craig E. McClean, a molded plastic container has an open neck portion. The container has a collapsible bladder inserted therein. The bladder has metallic ferrule at an open end thereof, and the ferrule is adapted to be supported at a location adjacent a rim of the neck portion. To provide for venting from the container during the filling of the bladder, and later during the dispensing of product therefrom, the rim is provided with a plurality of spaced apart upstanding bosses which define slots between adjacent ends of adjacent bosses. The ferrule, thus, rests on the bosses, and air can vent beneath the ferrule and the container through the slots. The container can also veto during dispensing, even with a closure affixed thereto, by providing a radial bead in the container with a plurality of longitudinally extending slots in the exterior thereof. Further, venting of the container, in the region between a juncture of the neck portion and a shoulder portion and the portion of the bladder surrounded by such region can be accomplished by providing a circumferentially spaced apart series of radially outwardly projecting dimples. I required, it may be provided by a circumferentially spaced apart plurality of longitudinally extending recesses on the inside of the open neck portion.

The patented invention differs from the present invention because the patented invention is a bladder system enclosed within a container that is vented to the atmosphere. The bladder is pressurized expelling the air within the container until the bladder expands to fill the interior of the container at which point the bladder is confined and further filling pressurizes the bladder. The contents are expelled by depressing a valve. The present invention is a device to demonstrate the effects of atmospheric pressure. It does not confine a fluid and when not in use is in a relaxed state and open to the atmosphere. In use air is withdrawn from the container and capped. The balloon expands due to the atmospheric pressure pushing the balloon into the confines of the container.

U.S. Pat. No. 4,960,217, titled BALLOON-TYPE BOTTLE SEALER, invented by Hsieh-Yih Teng describes a bottle sealer including a telescopic expansible hollow extension of a balloon shape formed on a disk portion of the sealer sealed in a bottleneck, and in fluid communication with a liquid filled bottle so that when the bottle is filled with a liquid or water, it is subjected to a freezing temperature to become ice. The balloon extension may serve as a buffer for absorbing the volume expansion due to a conversion of water into ice.

The patented invention differs from the present invention because the patented invention functions with fluids at freezing temperatures while the present invention functions with gasses.

In U.S. Pat. No. 4,854,945, titled BLADDER DEVICE AND METHOD FOR DISPLACING AIR IN A BOTTLE BORE SHAFT, invented by Herbert E. Ferree and William S. Beal a trapped air displacement device includes a flexible gas filled bladder and a device for inserting the bladder into a bottle bore of a turbine or generator shaft is described. The flexible bladder displaces the air trapped in the bottle bore region, so that it will escape along the slightly titled surface of the shaft. A protective tube is provided for the fragile bladder during positioning. The bladder can also be inflated by sealing a small amount of gas in the bladder and tube and applying a vacuum to the shaft.

The patented invention differs from the present invention because the patented invention is a device specifically used to remove air trapped in a bottle bore of a shaft typically used in a generator. It is not a device for demonstrating scientific principles. The present invention is an instructional toy used to illustrate the physical properties of air pressure, specifically decreasing air pressures within a contained environment, and its interaction with the elastic properties of a rubber balloon.

Numerous innovations for vacuum teaching devices have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to vacuum teaching device. More particularly, the present invention relates to vacuum teaching device consisting of a balloon within a housing to illustrate the physical properties of air pressure, specifically decreasing air pressures within a contained environment, and its interactions with the elastic properties of the balloon. The balloon is inflated manually by sucking air from the housing inside through the housing top opening while the housing top remains uncapped. To ensure that no air escapes from the balloon, the housing top cap is affixed pneumatically sealing the housing top. The balloon, although completely open in the housing middle neck piece to atmospheric pressure, remains continually inflated due to the reduction of air pressure in the housing inside.

The types of problems encountered in the prior art are demonstrating scientific principles such as air pressure is difficult and often expensive.

In the prior art, unsuccessful attempts to solve this problem were attempted namely: expensive compression and decompression chambers. However, the problem was solved by the present invention because it is inexpensive and easy to make.

Innovations within the prior art are rapidly being exploited in the field of teaching aids for science.

The present invention went contrary to the teaching of the art which describes decompression/compression chambers.

The present invention solved a long felt need of an easily made inexpensive teaching tool to describe to science students pressure differentials.

Accordingly, it is an object of the present invention to provide a vacuum teaching device.

More particularly, it is an object of the present invention to provide a vacuum teaching device which comprises a housing containing a balloon.

In keeping with these objects, and with others which will become apparent hereinafter, one feature of the present invention resides, briefly stated, in the housing comprising a housing top having a housing top opening upon which a housing top cap can easily be pneumatically sealed.

When the housing is designed in accordance with the present invention, it further comprises a housing bottom and a housing middle having a housing middle neck piece with a housing middle neck piece opening.

In accordance with another feature of the present invention, the balloon is inserted in the housing middle neck piece into the housing inside and the balloon opening is stretched overlapping the housing middle neck piece opening forming a pneumatic seal therebetween.

Another feature of the present invention is that when air pressure is reduced within the housing inside by vacuum through the housing top opening, the balloon automatically inflates and can remain inflated by pneumatically sealing the housing top with the housing top cap.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

Brief List of Reference Numerals Utilized in the Drawing

10—vacuum teaching device (10)
12—housing (12)
12A—housing top (12A)
12AA—housing top opening (12AA)
12B—housing bottom (12B)
12C—housing middle (12C)
12CA—housing middle neck piece (12CA)
12CAA—housing middle neck piece opening (12CAA)
12D—housing top cap (12D)
12E—housing inside (12E)
14—balloon (14)
14A—balloon opening (14A)

DESCRIPTION OF THE PREFERRED EMBODIMENT

Figure 1:
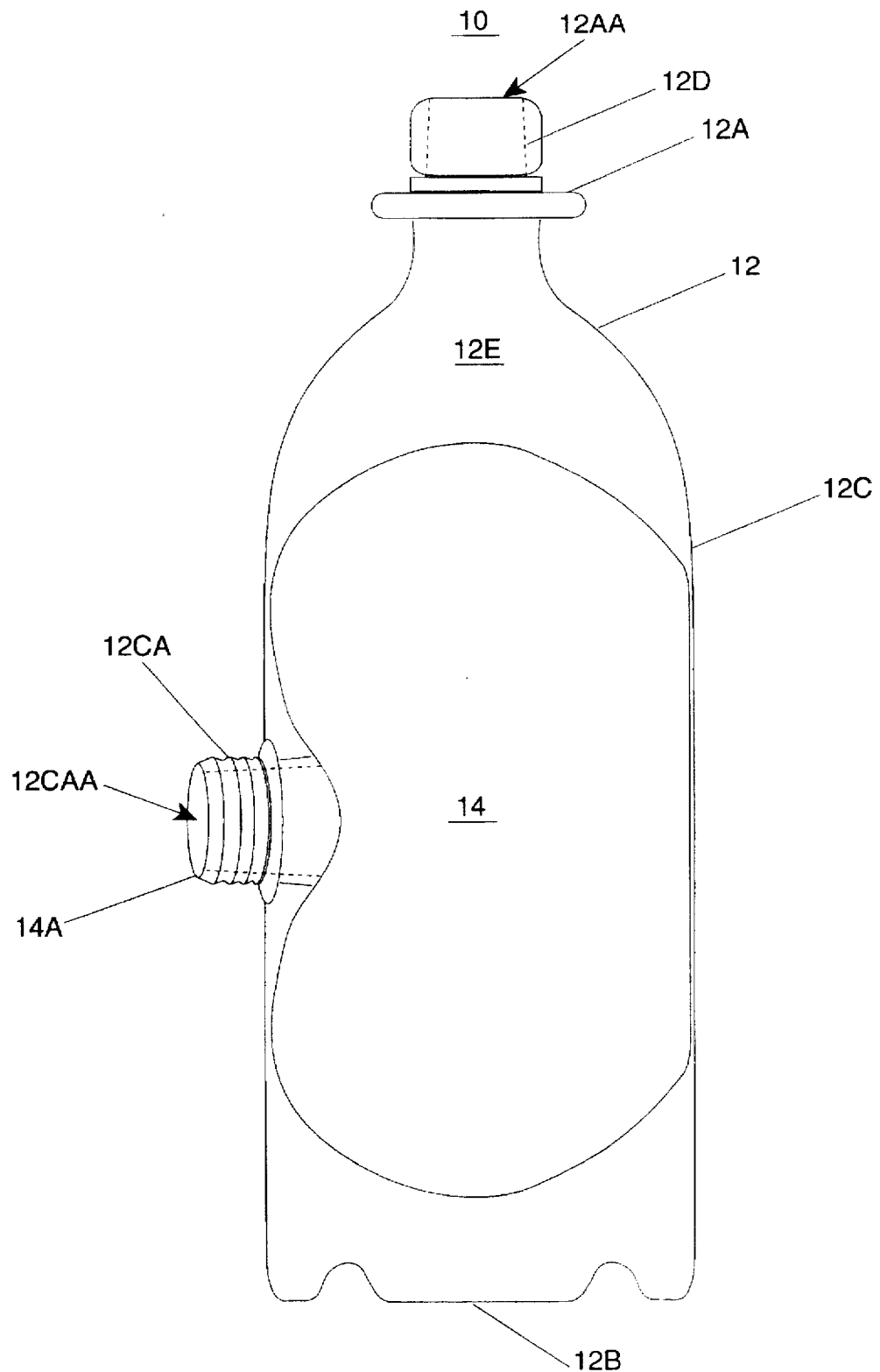
FIG. 1 is a side view of a vacuum teaching device exhibiting a balloon partially inflated within a housing.
Figure 1A:
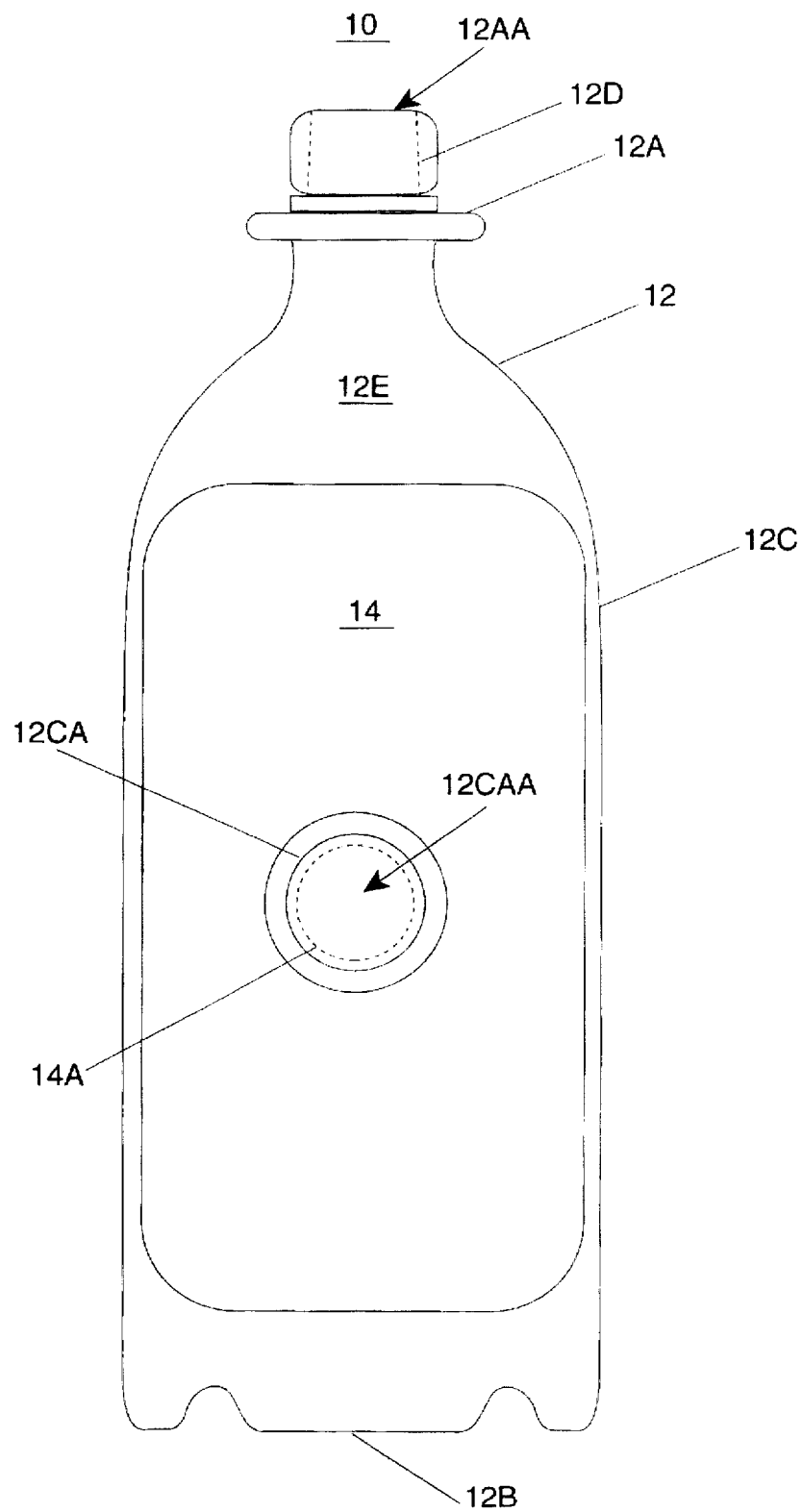
FIG. 1A is a front view of a vacuum teaching device exhibiting a balloon partially inflated within a housing.

Firstly, referring to FIG. 1 and FIG. 1A which are a side view and a front view, respectively, of a vacuum teaching device (10) exhibiting a balloon (14) partially inflated within a housing (12). The housing (12) comprises a housing top (12A) having a housing top opening (12AA), a housing bottom (12B), a housing middle (12C) having a housing middle neck piece (12CA) with a housing middle neck piece opening (12CAA), a housing top cap (12D), and a housing inside (12E). The housing middle neck piece (12CA) is preferably made by cutting a neck off of a bottle and forming an opening within the side of the housing middle (12C) which is slightly larger than the outside diameter of the bottle neck. The bottle neck is then inserted and pneumatically sealed within the housing middle (12C) opening. A balloon (14) in an uninflated position is inserted within the housing middle neck piece opening (12CAA) and the balloon opening (14A) is preferably pneumatically sealed to the housing middle neck piece (12CA) by stretching and overlapping.

When a user demonstrates vacuum pressure, the user reduces the atmospheric pressure within the housing inside (12E) by sucking air from the housing top (12A) through the housing top opening (12AA) until the balloon (14) inflates therein. balloon (14) inflation can be maintained by simply placing the housing top cap (12D) over the housing top (12A) thereby forming a pneumatic seal.

The balloon (14) is preferably manufactured from a material selected from a group consisting of rubber, rubber composites, plastic and plastic composites.

The housing (12) is preferably manufactured from a material selected from a group consisting of glass, glass composite, rubber, rubber composites, plastic and plastic composites. The housing (12) is preferably a size selected from a group consisting of one liter, two liter and three liter.

It will be understood that each of the elements described above, or two or more together, may also find a useful application in other types of constructions differing from the type described above.

While the invention has been illustrated and described as embodied in a vacuum teaching device, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A vacuum teaching device comprising:

a bottle selected from the group consisting of a standard one liter, two liter, and three liter plastic bottles, the bottle comprising a bottom, a middle portion and a top which enclose and define an inner space, said top having an opening therethrough and consisting of a top bottle neck of the type provided on said plastic bottle, an exterior of said top bottle neck defining circumferentially disposed threads, the middle portion of said bottle further comprising an opening into which is attached and sealed a middle bottle neck of a same configuration as the top bottle neck and including an opening extending therethrough;

a balloon provided in said inner space of said bottle, a neck of said balloon stretched and overlapped around said middle bottle neck opening such that no air can enter said inner space through said middle bottle neck except through said balloon, said balloon configured to cause a vacuum and simultaneously inflate within said inner space when a user suctions the bottle by removing air through said top opening; and a top cap having internally disposed threads configured to be screwed onto said exterior threads of said top bottle neck, said top cap adapted to maintain the vacuum and inflation of said balloon by closing said top cap over said top opening, after said user has suctioned the air out of the bottle.

2. The vacuum teaching device (10) as described in claim 1, wherein the balloon (14) is manufactured from a material selected from a group consisting of rubber, rubber composites, plastic and plastic composites.

* * * * *